US007019086B2

(12) United States Patent
Onoi et al.

(10) Patent No.: US 7,019,086 B2
(45) Date of Patent: Mar. 28, 2006

(54) PROCESS FOR PRODUCING MODIFIED POLYMER

(75) Inventors: Hidekazu Onoi, Hiratsuka (JP); Tetsuji Kawazura, Hiratsuka (JP); Keisuke Chino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/501,228

(22) PCT Filed: Dec. 1, 2003

(86) PCT No.: PCT/JP03/15354

§ 371 (c)(1),
(2), (4) Date: Jul. 12, 2004

(87) PCT Pub. No.: WO2004/050721

PCT Pub. Date: Jun. 17, 2004

(65) Prior Publication Data

US 2005/0124764 A1 Jun. 9, 2005

(30) Foreign Application Priority Data

Dec. 5, 2002 (JP) .............................. 2002-353831

(51) Int. Cl.
*C08C 19/22* (2006.01)
(52) U.S. Cl. ...................... 525/374; 525/525; 525/375; 525/377
(58) Field of Classification Search ................ 525/374, 525/375, 377
See application file for complete search history.

(56) References Cited

U.S. PATENT DOCUMENTS

| | | | |
|---|---|---|---|
| 4,581,429 A | 4/1986 | Solomon et al. | |
| 4,743,657 A | 5/1988 | Rekers et al. | |
| 5,610,250 A * | 3/1997 | Veregin et al. | .......... 526/219.3 |
| 6,653,409 B1 * | 11/2003 | Ashiura et al. | .......... 525/332.8 |
| 2003/0139536 A1* | 7/2003 | Bertin et al. | ................ 525/377 |

FOREIGN PATENT DOCUMENTS

| | | |
|---|---|---|
| DE | 102 08 098 A1 | 10/2002 |
| JP | 58-120608 A1 | 7/1983 |
| JP | 62-181360 A1 | 8/1987 |
| JP | 63-083169 A1 | 4/1988 |
| JP | 08-239510 A1 | 9/1996 |
| JP | 10-182881 A * | 7/1998 |
| JP | 10-182881 A1 | 7/1998 |
| JP | 20002122329 A * | 8/2000 |

OTHER PUBLICATIONS

International Search Report for PCT/JP03/15354 mailed on Mar. 2, 2004.

\* cited by examiner

*Primary Examiner*—Ling-Sui Choi
(74) *Attorney, Agent, or Firm*—Rader, Fishman & Grauer PLLC

(57) ABSTRACT

A process for producing a modified polymer having, in the molecule thereof, an organic group(s) introduced thereinto and derived from a compound(s) having a free radical comprising reacting a polymer such as an elastomer with a compound having the free radical stable at an ordinary temperature in the presence of oxygen, after or while a carbon radical(s) is generated in the polymer, whereby the modified polymer having an improved bondability and processability is formed.

5 Claims, No Drawings

PROCESS FOR PRODUCING MODIFIED POLYMER

TECHNICAL FIELD

The present invention relates to a process for producing a modified polymer, more particularly it relates to a process for producing a modified polymer by reacting a polymer such as an elastomer with a compound(s) having a free radical or radicals stable in the presence of oxygen at ordinary temperature (hereinafter referred to as "stable free radical").

BACKGROUND ART

For example, as disclosed in Japanese Unexamined Patent Publication (Kokai) No. 10-182881, it has been proposed to compound stable free radicals such as TEMPO (i.e., 2,2,6,6-tetramethyl-1-piperidinyloxy) into rubber to improve the physical properties of the rubber composition, in particular those such as processability, abrasion resistance. Further, Japanese Unexamined Patent Publication (Kokai) No. 8-239510 proposes to include a TEMPO derivative in a polymer to prevent polymer aging. However, no reference can be found relating to positively the generation of carbon radical or radicals in polymers such as rubbers so as to modify polymers using a compound(s) having a stable free radical or the radicals in the molecule thereof.

DISCLOSURE OF THE INVENTION

Accordingly, the object of the present invention is to modify a polymer such as an elastomer to improve the bondability (or adhesion) and processability of the polymer.

In accordance with the present invention, there is proposed a process for producing a modified polymer having, in the molecule thereof, an organic group or groups introduced thereinto and derived from a compound(s) having a free radical or the radicals comprising reacting a polymer with a compound(s) having the free radical or radicals stable at an ordinary temperature in the presence of oxygen, after or while a carbon radical or radicals are generated in the polymer.

BEST MODE FOR CARRYING OUT THE INVENTION

Compounds having a stable free radical or the radicals such as TEMPO quickly trap radicals produced by the cleavage of rubber by light, heat, or mechanical action. However, if trying to introduce functional groups into the molecules of an elastomer, it is not possible to sufficiently modify the elastomer with only a compound having stable free radicals such as TEMPO. Therefore, the inventors succeeded in introducing the desired functional groups into elastomer molecules by positively causing the generation of carbon radicals on the polymer molecular chains whereby the present invention has been completed.

As polymers capable of being modified according to the present invention, for example, diene-based rubbers such as natural rubbers (NR), polyisoprene rubbers (IR), various types of styrene-butadiene copolymer rubbers (SBR), various types of polybutadiene rubbers (BR), acrylonitrile butadiene copolymer rubbers (NBR), butyl rubbers (IIR), chloroprene rubbers (CR); olefin-based rubbers such as ethylene-propylene copolymer rubbers (EPM, EPDM), chlorosulfonated polyethylenes (CSM), epichlorohydrin rubbers (CO, ECO), acryl rubbers (ACM, ANM) and, polysulfide rubbers (OT) may be illustrated. Further, as thermoplastic elastomers capable of being modified according to the present invention, polystyrene-based TPE (SBS, SIS, SEBS), polyolefin-based TPE, polyvinyl chloride-based TPE, polyurethane-based TPE, polyester-based TPE, polyurethane-based TPE, polyamide-based TPE, etc. may be illustrated. Further, as a polyolefin capable of being modified according to the present invention, for example, polyethylene (PE), polypropylene (PP), polyvinyl chloride (PVC), chlorinated polymers (CPE, CPP), polystyrene (PS), styrene-acrylonitrile copolymer (SAN), acrylonitrile butadiene styrene (ABS), polyamide (PA), acetal resin (POM), polyphenylene oxide (PPO), polyester, polycarbonate (PC), polysulfone, polyketone, polyacrylonitrile (PAN), polyimide (PI), liquid crystal polymer (LCP), etc. may be mentioned.

On the other hand, as the compounds having, in the molecule thereof, a free radical or the radicals stable in the presence of oxygen at ordinary temperature capable of being used in the present invention, the following compounds may be illustrated.

Nitroxide Radicals

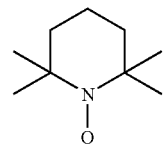

2, 2, 6, 6-tetramethyl-1-piperidinyloxy (TEMPO)

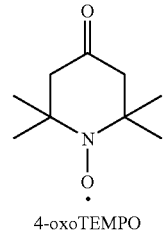

4-oxoTEMPO

General Formula

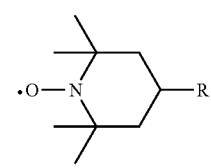

(1)

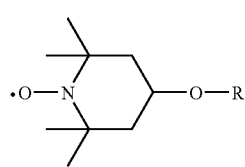

(2)

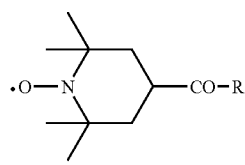

(3)

-continued (4)
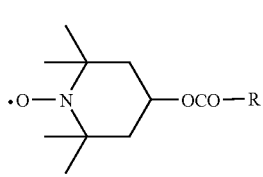

(5)
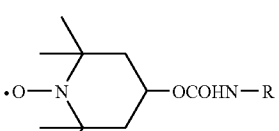

(6)
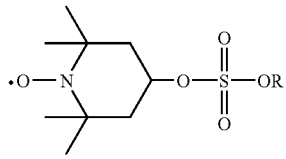

In formulae (1) to (6), R indicates a $C_1$ to $C_{30}$ alkyl group, allyl group, amino group, isocyanate group, hydroxy group, thiol group, vinyl group, epoxy group, thiirane group, carboxyl group, carbonyl group-containing group (e.g., cyclic acid anhydrides such as succinic anhydride, maleic anhydride, glutanic anhydride, phthalic anhydride,) organic groups containing functional groups an amide group, ester group, imide group, nitrile group, thiocyan group, $C_1$ to $C_{20}$ alkoxy group, silyl group, alkoxysilyl group, nitro group.

(1)
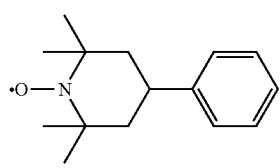

4-phenyl TEMPO   4-methyl TEMPO

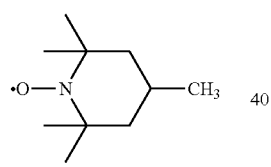

4-ethyl TEMPO   4-chloro TEMPO (2)
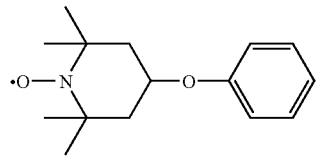

4-phenoxy TEMPO

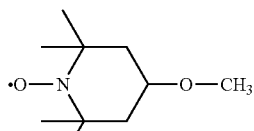 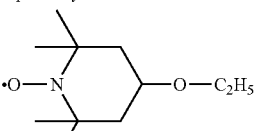

4-methoxy TEMPO   4-ethoxy TEMPO

-continued (3)
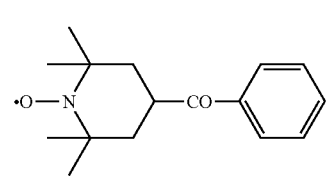

4-benzoyl TEMPO

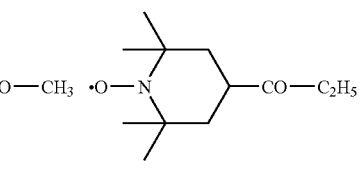

4-methylcarbonyl TEMPO   4-ethylcarbonyl TEMPO (4)
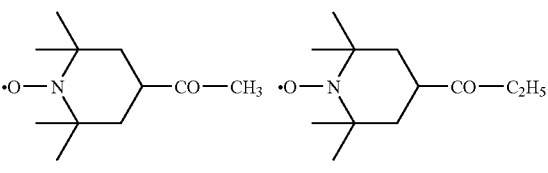

4-benzoyloxy TEMPO

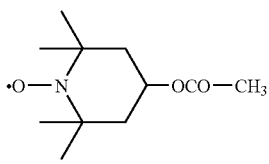

4-acetoxy TEMPO

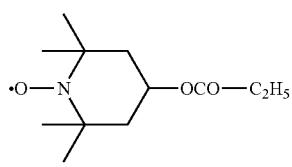

4-ethoxycarbonyl TEMPO (5)
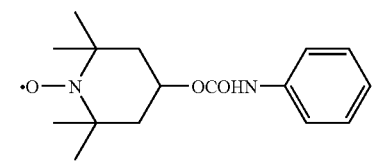

4-(N-phenylcarbamoyloxy) TEMPO

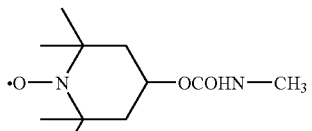

4-(N-methylcarbamoyloxy) TEMPO

-continued
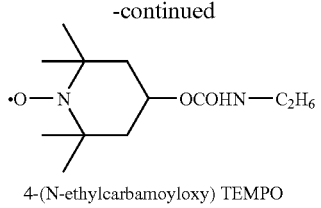
4-(N-ethylcarbamoyloxy) TEMPO
(6)
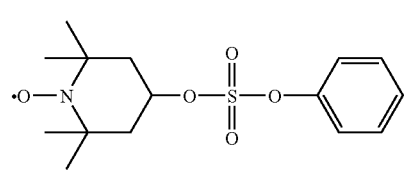
Phenyl (4-TEMPO) sulfate
-continued
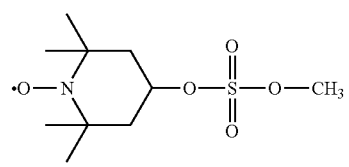
Methyl (4-TEMPO) sulfate
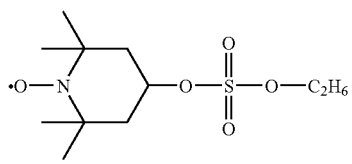
Ethyl (4-TEMPO) sulfate
Further, other examples may be given as follows:
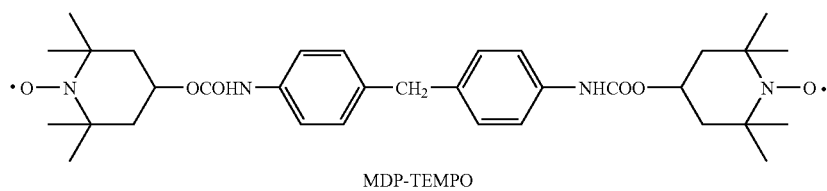
MDP-TEMPO
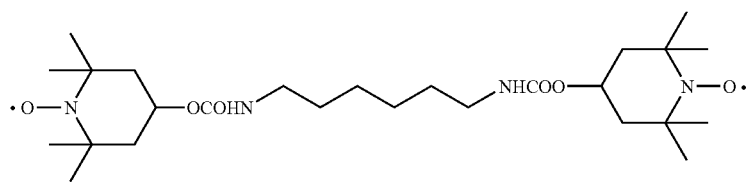
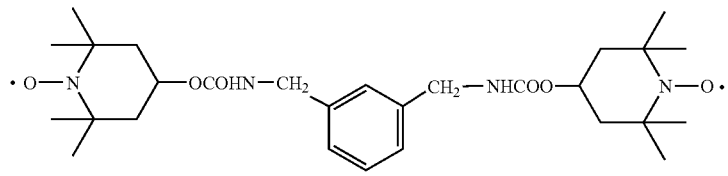
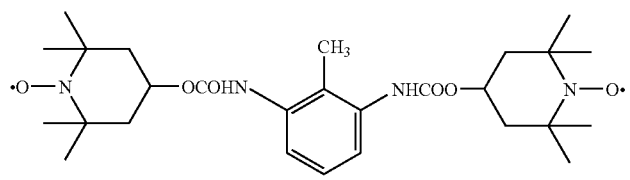
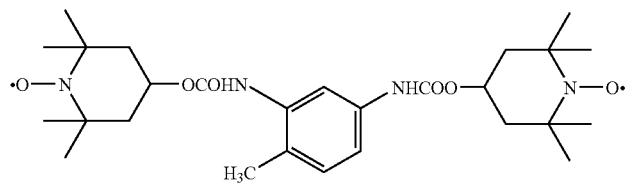

-continued
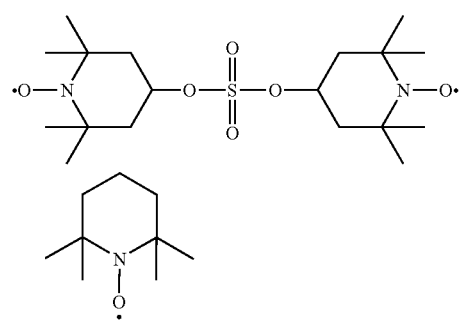
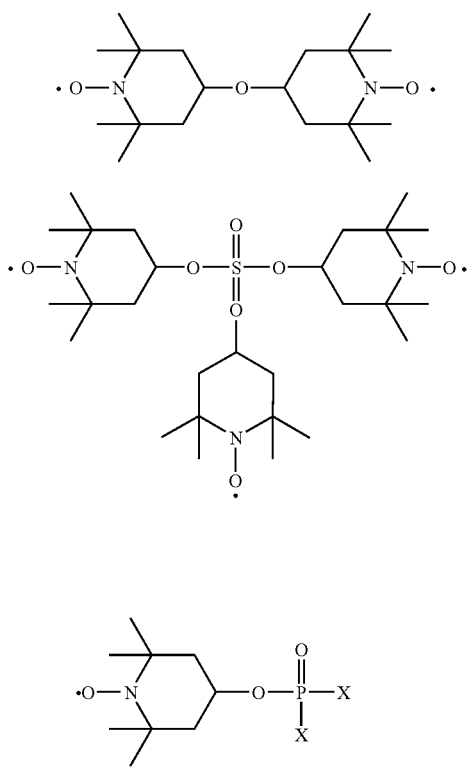
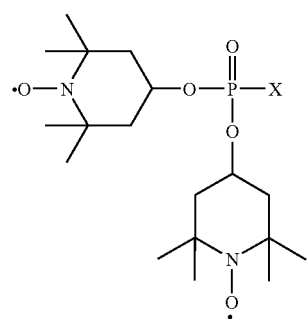
2, 2, 6, 6-
tetramethylpiperidin-1-yloxy
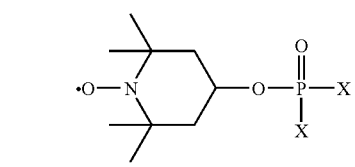
X; Br or Cl
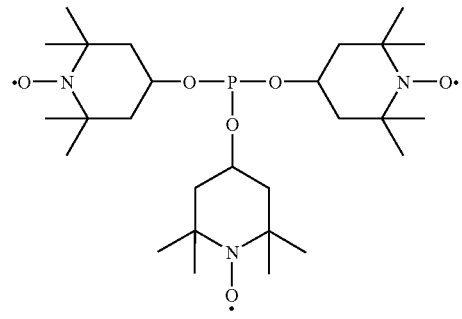
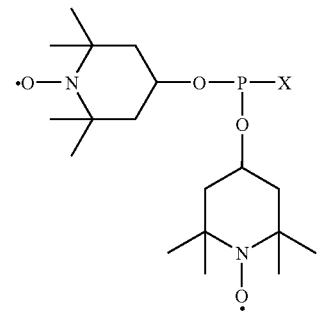
X; Br or Cl
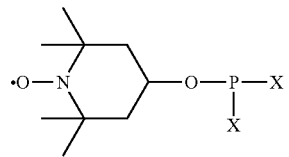
Hydrazyl Radical
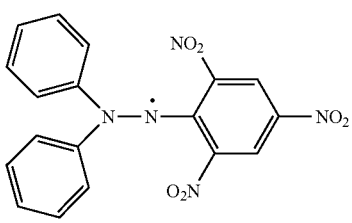
2, 2-diphenylbicrylhydrazyl -continued
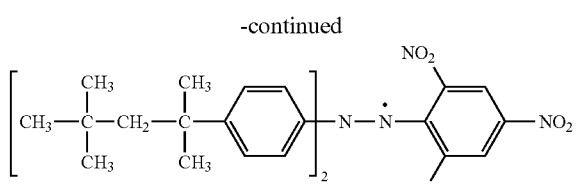
2, 2-di (4-tert-octylphenyl)-1-bicrylhydrazyl
Aryloxy Radical
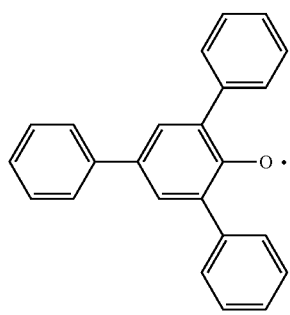
triphenyl phenoxy
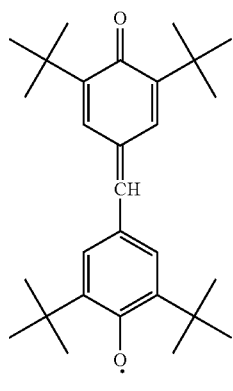
galvinoxyl
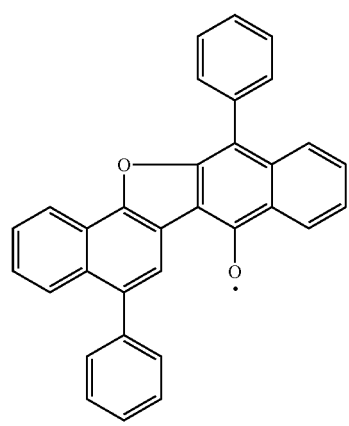
5, 12-diphenyl-7-oxyldinaphtho-[1, 2-b-2', 3-d] furan
Trityl Radical
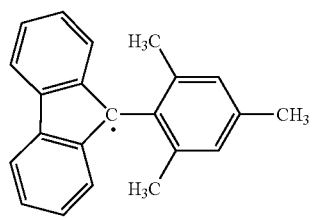
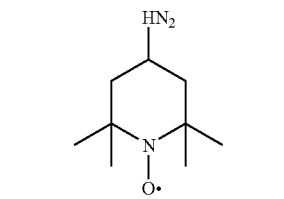
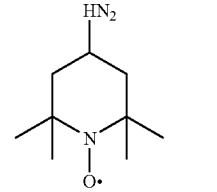
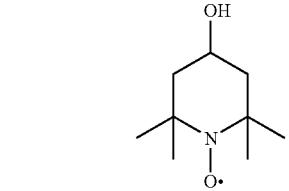
α,γ-bisdiphenylene-β-phenylallyl
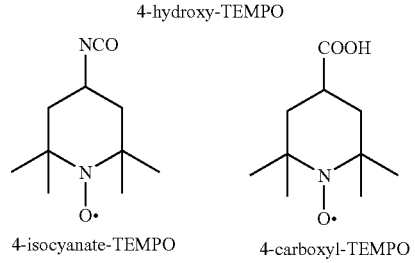
4-amino-2, 2, 6, 6-tetramethylpiperidinyloxy-TEMPO
4-hydroxy-TEMPO
4-isocyanate-TEMPO    4-carboxyl-TEMPO -continued
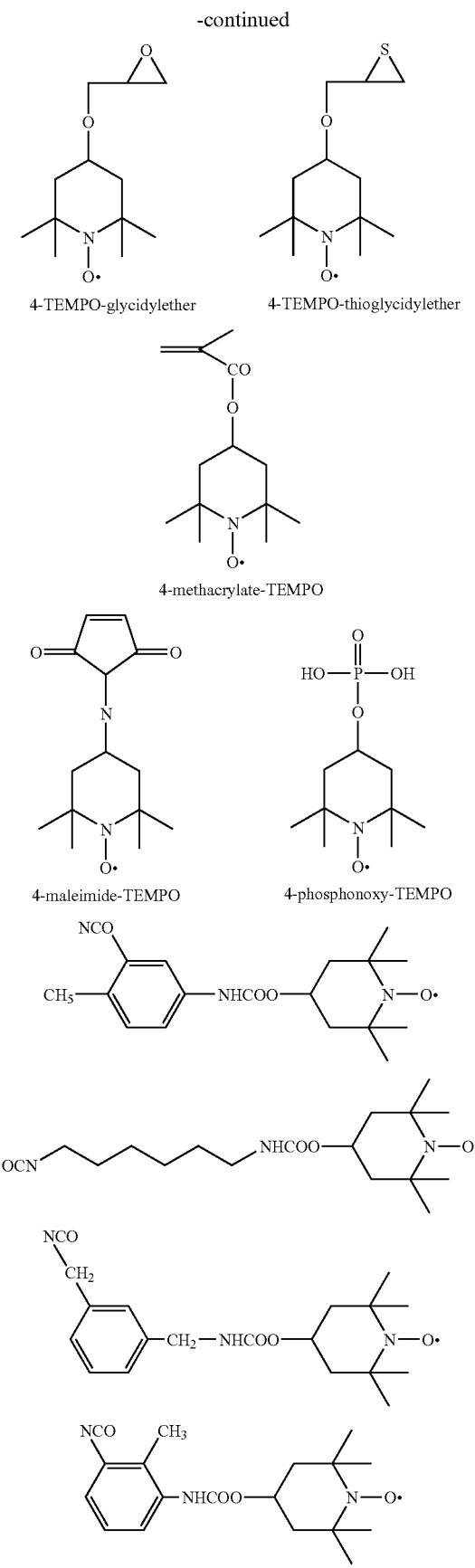
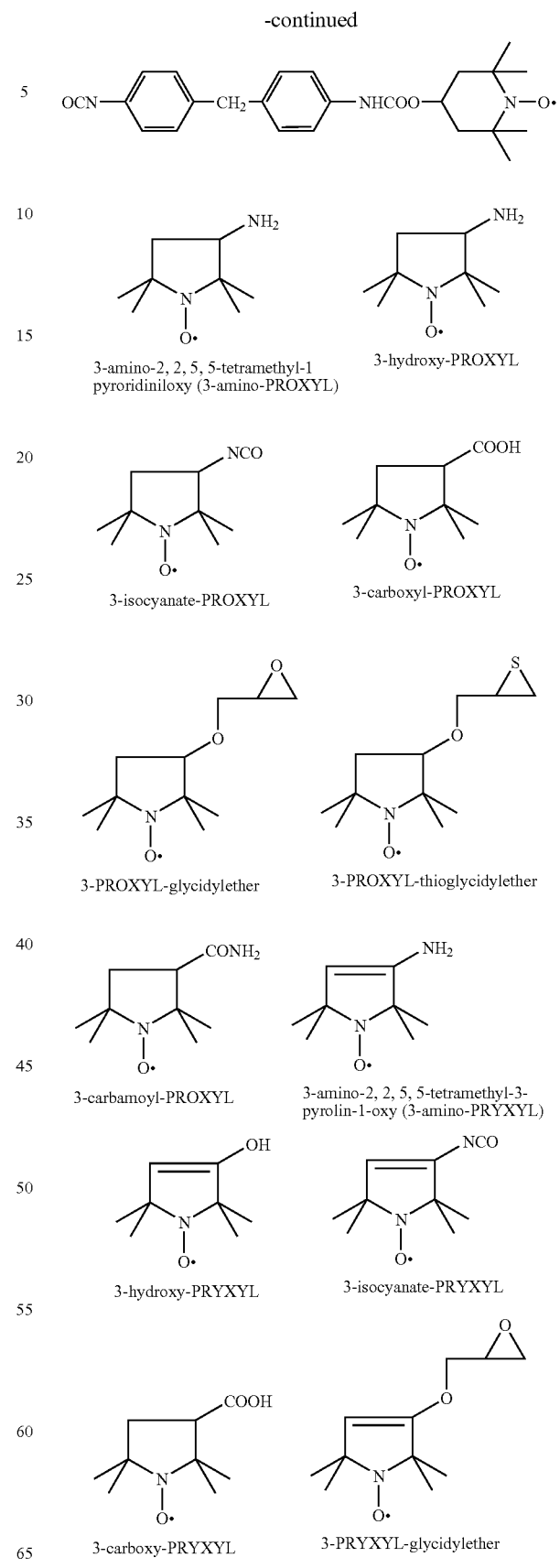

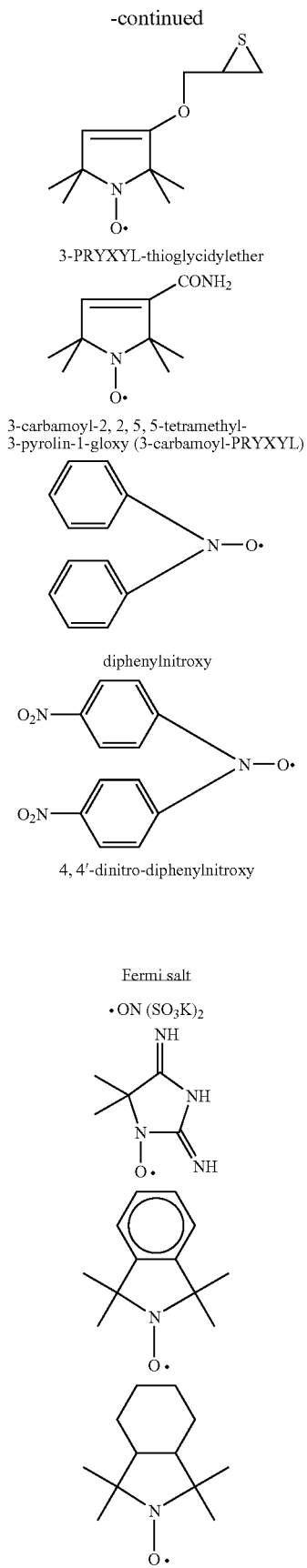

3-PRYXYL-thioglycidylether 3-carbamoyl-2, 2, 5, 5-tetramethyl-
3-pyrolin-1-gloxy (3-carbamoyl-PRYXYL)

diphenylnitroxy 4, 4'-dinitro-diphenylnitroxy

Fermi salt
·ON (SO$_3$K)$_2$

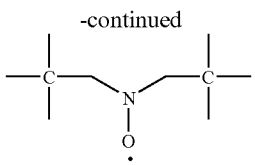

In the present invention, as the means for generating a carbon radical or radicals in the polymer, the method of adding a radical initiator to the reaction system, the method of applying electron beams, light, heat, and radiation to the reaction system, etc. may be used. As the radical initiator, for example, organic peroxides such as benzoyl peroxide (BPO), t-butylperoxybenzoate (Z), dicumyl peroxide (DCP), t-butylcumyl peroxide (C), t-butyl peroxide (D), 2,5-dimethyl-2,5-di-t-butylperoxyhexane (2,5B), 2,5-dimethyl-2,5-di-t-butylperoxy-3-hexyne (Hexyne-3), 2,4-dichloro-benzoylperoxide (DC-BPO), di-t-butylperoxy-di-isopropylbenzene (P), 1,1-bis(t-butylperoxy)-3,3,5-trimethyl-cyclohexane (3M), n-butyl=4,4-bis(t-butylperoxy)valerate, 2,2-bis(t-butylperoxy)butane, and azodicarbonamide (ADCA), azobisisobutylonitrile (AIBN), 2,2'-azobis-(2-amidinopropane)dihydrochloride, dimethyl 2,2'-azobis(isobutyrate), azobis-cyan valeric acid (ACVA), 1,1'-azobis-(cyclohexane-1-carbonitrile) (ACHN), 2,2'-azo-bis-(2,4-dimethylvaleronitrile) (ADVN), azobismethyl butylonitrile (AMBN), 2,2'-azobis-(4-methoxy-2,4-dimethylvaleronitrile), etc. may be mentioned. These radical generators can generate a carbon radical or radicals in a polymer by addition to a reaction system of the polymer and compound having such stable free radicals (mixture system or catalyzation system). The amount of the radical initiator added is preferably, based upon 100 parts by weight of the polymer, 0.1 to 6.0 parts by weight, more preferably 0.2 to 3.0 parts by weight.

According to the present invention, instead of the radical initiator or in addition to the radical initiator, it is possible to use an electron beam (for example, β-rays), light (for example, UV light) and/or radiation (for example, γ-rays or X-rays) etc. to generate carbon radicals in the polymer.

According to the present invention, as the organic group or groups introduced into the polymer by the modification of the polymer, for example, a $C_1$ to $C_{30}$ alkyl group, allyl group, amino group, isocyanate group, hydroxyl group, thiol group, vinyl group, epoxy group, thiirane group, carboxyl group, carbonyl group-containing group (for example, cyclic acid anhydrides such as succinate anhydride, maleic anhydride, glutanic anhydride, phthalic anhydride; an amide group, ester group, imide group, nitrile group, thiocyan group, $C_1$ to $C_{20}$ alkoxy group, silyl group, alkoxysilyl group, etc. may be illustrated.

In addition to the modified polymer, polymers such as diene-based rubbers, polyolefin-based rubbers, thermoplastic elastomer, polyolefins, various additives generally used for tire use or for other general rubber use reinforcing fillers such as carbon black or silica, vulcanization or cross-linking agent, vulcanization or cross-linking accelerator, various types of oils, anti-aging agent, plasticizer may be blended in. The formulations are mixed and vulcanized to obtain compositions by general methods and can be used for vulcanization or cross-linking. The amounts of these additives used may be made the general amounts used in the past in so far as the object of the present invention is not adversely affected.

EXAMPLES

The present invention will now be explained by the following Examples, but, of course, the scope of the present invention is not limited to these Examples.

Examples 1 to 2 and Comparative Examples 1 to 3

Synthesis of Modifying TEMPO 50.68 g of tolylene diisocyanate (TDI made by Sumitomo Bayer Urethane K.K.) was added to 50.0 g (0.291 mol) of OH-TEMPO (LA7RD made by Asahi Denka Kogyo K.K.) dissolved in 50 ml of acetone. The mixture was agitated at room temperature for 24 hours. It was confirmed that the isocyanate content was 11.96% (theoretical value 12.13%). The acetone was distilled off in vacuo, then the residue was dried to obtain the final product.

Production of Modified Polymer

Based on the formulations shown in Table I (parts by weight), a polymer (IR) and various compounding agents were mixed by means of rolls. The mixtures obtained were formed into sheets and heat treated in 150 mm×150 mm×2 mm molds at 170° C. for 10 minutes to obtain modified polymers. However, Comparative Example 3 is a mixture of a polymer and various compounding agents by means of a roll, without heat treatment.

TABLE I

| | Ex. 1 | Ex. 2 | Comp. Ex. 1 | Comp. Ex. 2 | Comp. Ex. 3 |
|---|---|---|---|---|---|
| IR | 100 | 100 | 100 | 100 | 100 |
| Modifying TEMPO | 1 | 2 | 1 | 2 | 2 |
| Radical initiator | 0.98 | 1.95 | — | — | 1.95 |
| Modification rate (wt %) | 0.23 | 0.65 | 0 | 0 | 0 |

(Notes)
IR: Nipol IR-2200 (Nippon Zeon K.K.)
Modifying TEMPOL: See above Synthesis
Radical initiator: Percumyl D-40 (Nihon Oil & Fat K.K.)

Modification Rate

First, a calibration curve for finding the modification rate of TDI-TEMPO on the polymer was prepared. Mixtures with different ratios of IR rubber and the modifying TEMPO were uniformly dissolved in toluene and the mixtures used for IR analysis. The calibration curve was obtained by averaging the two peak ratios of the peak ratio of the peak of 1376 $cm^{-1}$ of the IR rubber to the peak of 1727 $cm^{-1}$ of the modifying TEMPO and the peak ratio of the peak of 1448 $cm^{-1}$ of the IR rubber to the peak of 1727 $cm^{-1}$ of the modifying TEMPO. Similarly, the peak ratios of the modified polymers fabricated in Table I were calculated and the calibration curves used to find the modification rates.

In Table I, Comparative Examples 1 and 2 have no peroxide added, and therefore sufficient carbon radicals could not be generated in the polymers and the polymers could not be modified with the modifying TEMPO. In Comparative Example 3, peroxide was added, but no heat treatment was performed, and therefore sufficient carbon radicals could not be generated in the polymer and the rubber could not be modified with the modifying TEMPO. In Examples 1 and 2, peroxide was added and heat treatment performed, and therefore sufficient carbon radicals were generated in the polymers and the polymers could be modified with the modifying TEMPO.

Examples 3 to 4 and Comparative Examples 4 to 5

Synthesis of Modifying TEMPO 50.68 g of tolylene diisocyanate (TDI made by Sumitomo Bayer Urethane K.K.) was added to 50.0 g (0.291 mol) of OH-TEMPO (LA7RD made by Asahi Denka Kogyo K.K.) dissolved in 50 ml of acetone. The mixture was agitated at room temperature for 24 hours. It was confirmed that the isocyanate content was 11.96% (theoretical value 12.13%). The acetone was distilled off in vacuo, then the residue was dried to obtain the final product.

Method of Preparation of Examples 3 to 4 and Comparative Examples 4 to 5

Production of Modified Polymer

Based on the formulations shown in Table II (parts by weight), in Mixing 1, the ingredients were mixed by a Bambury mixer adjusted to a temperature of 80° C. and the mixture discharged when reaching 140° C. to prepare a master batch. Next, in Mixing 2, the ingredients except for the sulfur and vulcanization accelerator were mixed in a Bambury mixer adjusted to a temperature of 60° C. for 5 minutes, then a roll was used to add the sulfur and vulcanization accelerator and obtain the unvulcanized rubber.

TABLE II

| | Ex. 3 | Ex. 4 | Comp. Ex. 4 | Comp. Ex. 5 |
|---|---|---|---|---|
| Mixing 1 Formulation (parts by weight) | | | | |
| IR | 100 | 100 | — | — |
| Modifying TEMPO | 1.2 | 2.4 | — | — |
| Radical initiator | 0.98 | 1.95 | — | — |
| NP total | 102.18 | 104.35 | — | — |
| Mixing 2 Formulation (parts by weight) | | | | |
| NP | 102.18 | 104.35 | — | — |
| IR | — | — | 100 | 100 |
| Modifying TEMPO | — | — | 1.2 | 2.4 |
| Radical initiator | — | — | 0.98 | 1.95 |
| Carbon black | 60 | 60 | 60 | 60 |
| Zinc white | 3 | 3 | 3 | 3 |
| Stearic acid | 1 | 1 | 1 | 1 |
| Antioxidant | 1 | 1 | 1 | 1 |
| Aromatic oil | 5 | 5 | 5 | 5 |
| Sulfur | 2.5 | 2.5 | 2.5 | 2.5 |
| Vulcanization accelerator CZ | 1 | 1 | 1 | 1 |
| Modification rate (wt %) | 0.35 | 0.51 | 0 | 0 |
| Bonding test | | | | |
| Pullout force (N) | 75 | 87 | 12 | 14 |

(Notes)
IR: Nipol IR-2200 (made by Nippon Zeon K.K.)
Radical initiator: Percumyl D-40 (Nihon Oil & Fat K.K.)
Carbon black: HTC-100 (Chubu Carbon)
Stearic acid: Beads Stearic Acid (Nihon Oil & Fat K.K.)
Antioxidant: Nocrac 224 (Ouchi Shinko Chemical Industrial K.K.)
Aromatic oil: Desolex No. 3 (Showa Shell Sekiyu K.K.)
Sulfur: Oil extended sulfur (Karuizawa Refinery K.K.)
Vulcanization accelerator CZ: Noccelar CZ-G (Ouchi Shinko Chemical Industrial K.K.)

Method of Fabrication of Bonding Test Samples and Test Method

Fiber cord (3300 dtex) composed of one type of polyester fiber, that is, polyethylene terephthalate fiber (PET), was dipped in a 2% aqueous solution of an epoxy compound (diglycerol triglycidyl ether), dried at 120° C. for one minute, then heat treated at 240° C. for 2 minutes. The polyester fiber cord thus treated was embedded in a predetermined length in the unvulcanized rubber which was then vulcanized at 150° C. for 30 minutes to prepare a bonding test sample. The bonding test was based on the JIS 1017 T-Test Method. The cord was pulled out from the sample and the pullout force at that time was measured.

As shown in Table II, in a rubber composition using a master batch mixed by a Bambury mixer adjusted to a high temperature in Mixing 1, modification by the modifying TEMPO was confirmed. In this rubber composition, the bondability with the fiber was improved, but in rubber compositions where modification was not confirmed, the bondability with the fiber was not improved.

Examples 5 to 6 and Comparative Examples 6 to 7

Synthesis of Modifying TEMPO 50.68 g of tolylene diisocyanate (TDI made by Sumitomo Bayer Urethane K.K.) was added to 50.0 g (0.291 mol) of OH-TEMPO (LA7RD made by Asahi Denka Kogyo K.K.) dissolved in 50 ml of acetone. The mixture was agitated at room temperature for 24 hours. It was confirmed that the isocyanate content was 11.96% (theoretical value 12.13%). The acetone was distilled off in vacuo, then the residue was dried to obtain the final product.

Production of Modified Polymer

PP and the various compounding agents were mixed by a nitrogen-substituted kneader at 200° C. for 15 minutes to obtain a modified polymer.

Modification Rate

A calibration curve for finding the modification rate of TDI-TEMPO on the PP was prepared. Mixtures with different ratios of PP and modifying TEMPO were prepared by kneaders and used for IR analysis. The calibration curve was obtained by averaging the two peak ratios of the peak ratio of the peak of 1376 $cm^{-1}$ of PP with respect to the peak of 1727 $cm^{-1}$ of the modifying TEMPO and the peak ratio of the peak of 1460 $cm^{-1}$ of PP with respect to the peak of 1727 $cm^{-1}$ of the modifying TEMPO. Similarly, the peak ratios of the modified polymers fabricated in Table III were calculated and the calibration curves used to find the modification rates.

TABLE III

|  | Ex. 5 | Ex. 6 | Comp. Ex. 6 | Comp. Ex. 7 |
| --- | --- | --- | --- | --- |
| Formulation (parts by weight) | | | | |
| PP | 100 | 100 | 100 | 100 |
| Modifying TEMPO | 1 | 2 | 1 | 2 |
| DCP | 0.5 | 1 | — | — |
| Modification rate (wt %) | 0.31 | 0.55 | 0 | 0 |

(Notes)
PP: Polypropylene (made by Sumitomo Chemical K.K.)
Modifying TEMPO: See above Synthesis
DCP: Dicumyl peroxide (Aldrich Chemical K.K.)

As shown in Table III, in Examples 5 and 6, modification of the polymer was confirmed in samples adding modifying TEMPO and peroxide to PP and mixing them at a high temperature. In Comparative Examples 6 and 7, peroxide was not added, and therefore the PP could not be modified.

INDUSTRIAL APPLICABILITY

According to the present invention, by modifying a polymer, the bondability and processability can be improved and the polymer can be effectively used for rubber products such as tires, conveyor belts, hoses, and also as plastic products.

What is claimed is:

1. A process for producing a modified polymer having, in the molecule thereof, an organic group introduced thereinto and derived from a compound(s) having a mono-nitroxide free radical(s), said process comprising:
   generating a carbon radical(s) in the molecule of a polymer to be modified by at least one means for generating a carbon radical selected from the group consisting of a radical initiator, electron beam, light and radiation; and
   reacting the polymer having the carbon radical(s) generated above with a compound(s) having the mono-nitroxide free radical stable at an ordinary temperature in the presence of oxygen.

2. A process for producing a modified polymer as claimed in claim 1, wherein said organic group is at least one group selected from the group consisting of a $C_1$ to $C_{30}$ alkyl group, allyl group, amino group, isocyanate group, hydroxyl group, thiol group, vinyl group, epoxy group, thiirane group, carboxyl group, carbonyl-group containing group, amide group, ester group, imide group, nitrile group, thiocyan group, $C_1$ to $C_{20}$ alkoxy group, silyl group and alkoxysilyl group.

3. A process for producing a modified polymer as claimed in claim 1, wherein a means for generating a carbon radical is the use of a radical initiator.

4. A process for producing modified polymer as claimed in claim 3, wherein the amount of use of the radical initiator is 0.1 to 0.6 parts by weight based upon 100 parts by weight of said polymer.

5. A process for producing a modified polymer as claimed in claim 1, wherein the generation of the carbon radical is carried out in the presence of the compound(s) having the mono-nitroxide free radicals.

* * * * *